US010126546B2

(12) United States Patent
Bustamante et al.

(10) Patent No.: US 10,126,546 B2
(45) Date of Patent: Nov. 13, 2018

(54) DRIFT-CORRECTED, HIGH-RESOLUTION OPTICAL TRAP AND HIGH-SENSITIVITY ANGULAR INTERFEROMETER

(71) Applicant: THE REGENTS OF THE UNIVERSITY OF CALIFORNIA, Oakland, CA (US)

(72) Inventors: Carlos J. Bustamante, Berkeley, CA (US); Troy A. Lionberger, Berkeley, CA (US); Yves Coello, Lima (PE)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 255 days.

(21) Appl. No.: 14/809,991

(22) Filed: Jul. 27, 2015

(65) Prior Publication Data

US 2016/0027545 A1 Jan. 28, 2016

Related U.S. Application Data

(63) Continuation of application No. PCT/US2014/013697, filed on Jan. 29, 2014.
(Continued)

(51) Int. Cl.
G02B 26/08 (2006.01)
G02B 27/28 (2006.01)
(Continued)

(52) U.S. Cl.
CPC ......... *G02B 26/0816* (2013.01); *G02B 21/18* (2013.01); *G02B 21/32* (2013.01);
(Continued)

(58) Field of Classification Search
CPC .................................................. G02B 26/0816
(Continued)

(56) References Cited

U.S. PATENT DOCUMENTS 4,447,153 A 5/1984 Cremers et al.
7,133,132 B2 * 11/2006 Bustamante ........... G02B 27/62
250/251
(Continued)

OTHER PUBLICATIONS

Korean Intellectual Property Office (KIPO), International Search Report and Written Opinion, PCT International Application No. PCT/US2014/013697, dated May 6, 2014, pp. 1-11, with claims searched, pp. 12-18, counterpart to U.S. Appl. No. 14/809,991.
(Continued)

*Primary Examiner* — Tarifur Chowdhury
*Assistant Examiner* — Omar Nixon
(74) *Attorney, Agent, or Firm* — O'Banion & Ritchey LLP; John P. O'Banion

(57) ABSTRACT

A drift-adjusted interferometer and optical trap are disclosed that employ two reference beams with an optical property that allows them to be separated from the two trapping beams. The reference and trapping beams are combined collinearly and optically inverted so that each reference beam overlays with the opposite trapping beam. Each pair of beams is then focused on a microsphere and the resulting four back-focal plane interferometry signals are monitored such that the relative motion between a given trapping beam with its overlaid reference beam provides a direct measurement of the physical drift occurring due to mechanical drift of the differential path components.

9 Claims, 7 Drawing Sheets

Related U.S. Application Data

(60) Provisional application No. 61/758,668, filed on Jan. 30, 2013, provisional application No. 61/758,148, filed on Jan. 29, 2013.

(51) Int. Cl.
  *G02B 27/14* (2006.01)
  *G02B 21/32* (2006.01)
  *G02B 21/18* (2006.01)

(52) U.S. Cl.
  CPC ....... *G02B 26/0858* (2013.01); *G02B 27/141* (2013.01); *G02B 27/283* (2013.01)

(58) Field of Classification Search
  USPC ........................................................ 356/492
  See application file for complete search history.

(56) References Cited

U.S. PATENT DOCUMENTS

| 7,800,750 | B2* | 9/2010 | Bustamante | G02B 21/32 356/244 |
|---|---|---|---|---|
| 2001/0033383 | A1 | 10/2001 | Kramer | |
| 2004/0071331 | A1 | 4/2004 | Lawless et al. | |
| 2005/0146718 | A1* | 7/2005 | Bustamante | G02B 27/62 356/338 |
| 2007/0284516 | A1* | 12/2007 | Bustamante | G02B 21/32 250/251 |
| 2009/0021723 | A1* | 1/2009 | De Lega | G01B 9/02027 356/73 |
| 2010/0099076 | A1 | 4/2010 | Mao et al. | |
| 2010/0251437 | A1* | 9/2010 | Heyn | B82Y 35/00 850/1 |
| 2012/0288925 | A1* | 11/2012 | Wang | G02B 21/32 435/287.2 |

OTHER PUBLICATIONS

Moffitt, Jeffrey R. et. al., "Differential Detection of Dual Traps Improves the Spatial Resolution of Optical Tweezers", Proceedings of the National Academy of Sciences of the United States of America (PNAS), Jun. 13, 2006, vol. 103, No. 24, pp. 9006-9011.

* cited by examiner

DRIFT-CORRECTED, HIGH-RESOLUTION OPTICAL TRAP AND HIGH-SENSITIVITY ANGULAR INTERFEROMETER

CROSS-REFERENCE TO RELATED APPLICATIONS

This application is a 35 U.S.C. § 111(a) continuation of PCT international application number PCT/US2014/013697 filed on Jan. 29, 2014, incorporated herein by reference in its entirety, which claims priority to, and the benefit of, U.S. provisional patent application Ser. No. 61/758,148 filed on Jan. 29, 2013, incorporated herein by reference in its entirety, and which also claims priority to, and the benefit of, U.S. provisional patent application Ser. No. 61/758,668 filed on Jan. 30, 2013, incorporated herein by reference in its entirety. Priority is claimed to each of the foregoing applications.

The above-referenced PCT international application was published as PCT International Publication No. WO 2014/120,844 on Aug. 7, 2014, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to optical instruments, and more particularly to drift corrected optical instruments.

2. Description of Related Art

Conventional dual-trap optical tweezers employ two laser beams, one of which (at least) is steered by a device such as a piezoelectric mirror or acousto-optic modulator. Each beam is focused by a microscope objective to trap two microspheres tethered by a molecule of interest and the displacements of the beads are monitored to follow the dynamics of the system being studied.

One critical problem currently limiting the performance of high-resolution optical traps is that the mechanical drift of optical components often results in physical drift in the location of an optical trap that is larger than the detected displacement-of-interest. The motion of biological motor proteins that are specific to interacting with DNA often take steps along the double helix that is on the order of 0.3 nm in size, and so accurate measurements of this small motion requires that drift of the trap positions be smaller than this value. However, the current best-performing optical traps suffer from instrumental drift that is almost twice what can be tolerated, and at least a substantial source of this noise is mechanical drift in optical components that are required for beam steering.

The precision of conventional optical tweezers relies on the passive stability of the instrument itself, and therefore demands costly engineering solutions aimed at controlling environmental noise that can be coupled into the optical components and result in mechanical drift of the traps. This results in costly engineering solutions to limiting environmental noise in the optical mounts, such as optical tables and basement laboratories for vibration isolation and temperature control. Consequently, high-resolution measurements are not currently possible in laboratory settings that lack the resources (e.g. vibration isolation and temperature stability) to implement these strict conditions.

BRIEF SUMMARY OF THE INVENTION

An observation of the present invention is that the vast majority of the instrumental noise limit is due to angular variations of the collimated beams of light used to form the optical traps. Further, one significant component of this noise is from mechanical drift in the optical components that are required for beam steering. Owing to the critical role of these components in all optical trapping systems, an object of the present invention is to measure and correct this unwanted trap drift.

The present invention uses back focal interferometry to measure, with angstrom-level precision, previously undetectable levels of mechanical trap drift inherent within particular components of optical tweezers. The systems and methods of the present invention successfully measure for and correct for the mechanical drift of optical trap components to reduce the noise floor below levels that have not previously been observed.

The systems and methods of the present invention allow for state-of-the-art measurements in previously inaccessible settings by providing for a real-time measurement of instrument drift. In one embodiment, the systems and methods of the present invention may be employed as a modular addition to commercially available optical traps, and thus broaden their target market beyond biophysics specialists to the entire biology community at large.

In one embodiment, a reference beam (comprising coincident p-polarized and s-polarized beams) is deflected from a trapping beam (comprising coincident p-polarized and s-polarized beams) using a two-sided dichroic mirror assembly, reimaged back onto a steerable mirror face using a 1× telescope with relay lenses, and is recombined with the trapping beam using the two-sided dichroic mirror. The steered reference beam adopts the same angle as the fixed trapping beam, and likewise, the fixed reference beam adopts the angle of the steered trapping beam. After recombination of reference and trapping paths, the p-polarized reference beam is overlaid with the s-polarized trapping beam, and vice versa.

In another embodiment, reference and trap beams are directed to a beam steering beam setup which comprises a polarizing beam splitter, a fixed mirror and steerable mirror and quarter waveplates. As a result each beam is split in two polarizations (comprising coincident p-polarized and s-polarized beams), one directed to the fixed mirror (fixed trap)

and the other directed to the steerable one (steerable trap). A dichroic mirror sends the reference beams to an optical setup designed to invert and offset the angle of the reference beams, relative to the angles of the corresponding trapping beams. The two polarizations are recombined and analyzed. As a result, after recombination at the dichroic mirror, the fixed reference beam overlays with the steerable trapping beam and the steerable reference beam overlays with the fixed trapping beam.

Another aspect is a drift-adjusted interferometer comprising a microscope objective, a condenser and a photodetector. The microscope objective is used to focus the sample beam to a microsphere, which may be, for instance, fixed in the optical setup. Angle variations of the sample beam produce a change of the interference pattern at the back-focal plane of the condenser, wherein the pattern is imaged onto a position-sensitive detector which provides a signal proportional to the angular change of the beam (back-focal plane interferometry). The angle variation of the sample beam can also, for instance, be measured relative to a reference beam with an optical property that allows both beams to be separated after the condenser (i.e., orthogonal polarizations or different wavelengths). In such embodiment, the two beams are focused onto the microsphere and the difference between the back-focal plane interferometry signal of the sample and reference beam corresponds to the angular variation of the sample respect to the reference beam.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
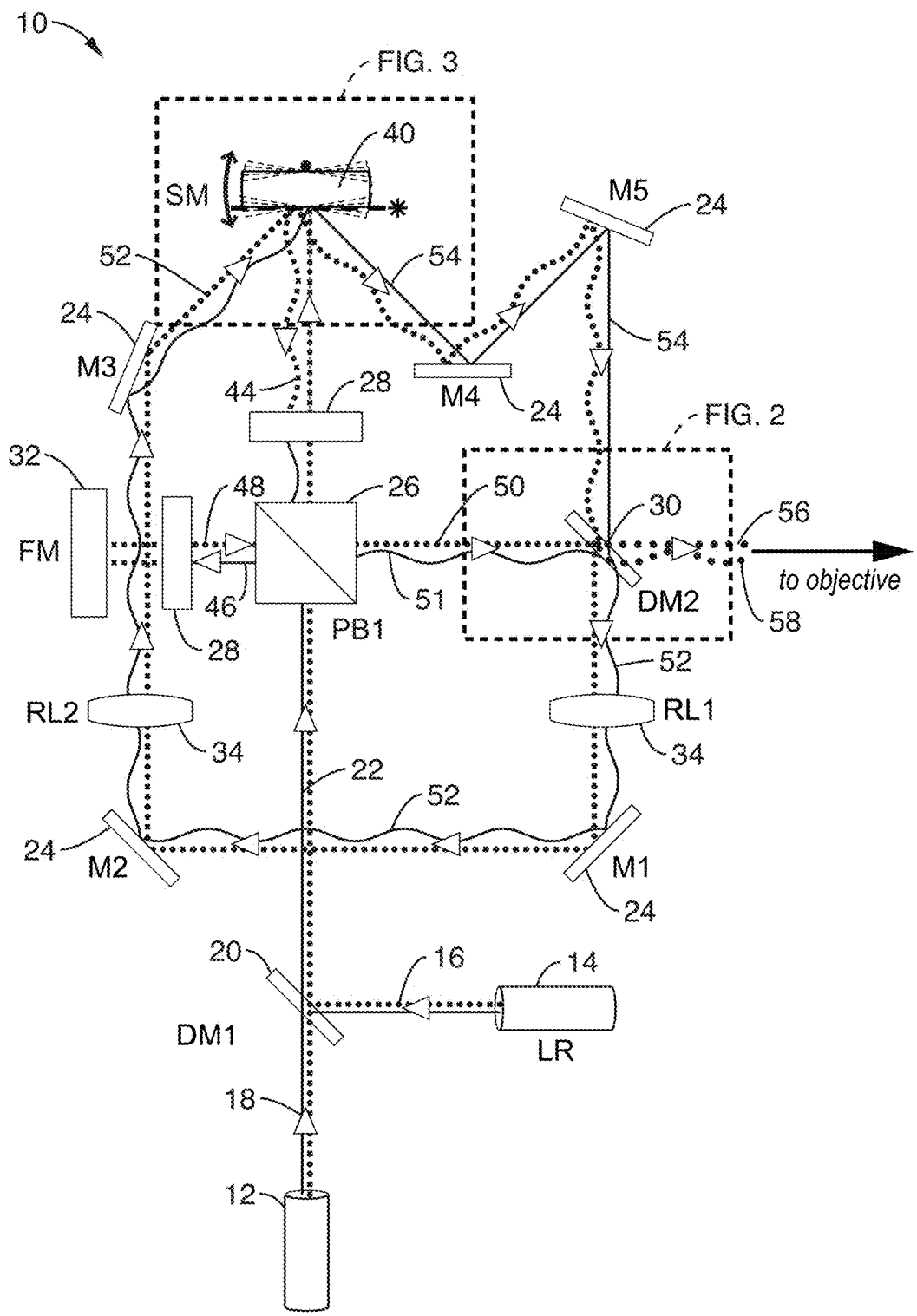
FIG. 1 is a schematic diagram of a drift-corrected, high-resolution optical trap in accordance with the present invention.

The systems and methods of the present invention may be implemented within a number of different types of optical instruments wherein correction for mechanical drift in optical components of the instruments is desired. Two such implementations are detailed below with respect to optical traps and interferometers. However, one skilled in the art would appreciate that the systems and methods of the present invention may be applied to any number of optical systems.

A. Drift-Corrected, High-Resolution Optical Trap.

The optical traps, or tweezers, of the present invention employ two reference beams with an optical property that allows them to be separated from the two trapping beams, for instance with a different wavelength. The reference and trapping beams are combined collinearly, and there each reference beam travels the same path as one of the trapping beams and thus experience the same angular noise. Before being sent to the microscope objective, the reference beams are optically inverted so that each reference beam overlays with the opposite trapping beam. Each pair of beams is then focused on a microsphere and the resulting four back-focal plane interferometry signals are monitored. In doing so, the relative motion between a given trapping beam with its overlaid reference beam provides a direct measurement of the physical drift occurring due to mechanical drift of the differential path components, as explained below.

In a conventional dual optical trap instrument, the position of each optically trapped bead relative to the focus of its trap is measured using back focal plane interferometry. Using differential detection, two bead displacement signals are monitored over time, $T_F$ and $T_S$ (corresponding to the fixed and steered traps, respectively). The difference between these two displacement signals, $\Delta x$, includes both the change in end-to-end distance of a tethering molecule ($\Delta x_{tether}$) and the relative trap displacements ($\Delta x_{trap}$), as indicated in the following equation:

$$\Delta x = (T_F - T_S) = \Delta x_{tether} + \Delta x_{trap} \qquad \text{Eq. 1}$$

With the additional two reference signals obtained, referred to as $R_F$ and $R_S$, the reference signals from the fixed and steered beams, respectively, three additional differential combinations are possible. The first is the uncorrected reference signal, ($R_F - R_S$). In principle, the uncorrected reference signal should be identical to the uncorrected trapping signal ($T_F - T_S$) since any additional angular drift arising from the manipulation of the two reference beams introduce positional noise ($\Delta x_{reference}$) that is correlated and therefore cancelled. The other two combinations involve the reference and trapping beam pairs following either the fixed or steered path, ($T_F - R_F$) and ($R_S - T_S$), respectively. Whereas these additional differential signals are free of positional drift owing to the mechanical fluctuations of the beam steering components ($\Delta x_{trap}$) because this noise is correlated between the two signals, they are susceptible to relative positional drift arising from the optics used for the reference beam manipulation ($\Delta x_{reference}$):

$$(R_S - T_S) = \Delta x_{tether} + \Delta x_{reference} \qquad \text{Eq. 2}$$

$$(T_F - R_F) = \Delta x_{tether} - \Delta x_{reference} \qquad \text{Eq. 3}$$

From Eq. 2 and Eq. 3, an expression for $\Delta x_{tether}$ that is free of drift can be obtained:

$$\Delta x_{tether} = \frac{1}{2}(T_F - T_S + R_S - R_F)$$

FIG. 1 shows a schematic diagram of first embodiment of a drift-corrected, high-resolution optical trap 10 in accordance with the present invention. A reference beam 16 (having a first wavelength) generated from reference laser 14 is combined with a trapping beam 18 (having a second wavelength) from trapping laser 12 using a first dichroic mirror 20 (DM1), and the beams remain collinear as combined beam 22 through the optical components in the beam steering path. For all beam paths illustrated herein, a solid line (s-polarized) and dotted line (p-polarized) are included in each beam in equal intensities. The combined beam 22 (including both polarizations and both wavelengths) is then directed at polarized beam splitter 26 (PB1). The s-polarized beams 46 (both reference and trap) are reflected at 90° and exit to the left of PB1 26. The p-polarized beams 42 (both reference and trap) pass through and exit to the top of PB1 26.

The s-polarized beams 46 exiting PB1 26 to the left pass through a λ/4 retardation plate 28 and are made circularly polarized. This allows the beam 46 to reflect off of fixed mirror 32 (FM) and pass back through the λ/4 retardation plate 28 a second time, turning the reflected beam 48 to now be p-polarized. This manipulation has the effect of turning the (s-polarized) beam 46 that exited the PB1 26 into an orthogonal polarization (p-polarized) beam 48, which will now enter the PB1 26 again, pass through it, and exit to the right.

This process is similarly repeated for the p-polarized beam 42 (see FIG. 3) that exits the top of PB1 26 (it passes through a λ/4 plate 28, becomes circular, gets reflected off a steerable mirror 40 (SM) as steered beam 44 (all beams illustrated with a wave-like shape are steered beams), passes back through λ/4 plate 28 a second time, and is then turned s-polarized). Steered beam 44 then enters the top of PB1 26 and is reflected, exiting to the right as beam 51. The overall effect of this manipulation is to allow for the independent splitting of each beam based on polarization, imparting an angle onto one of them via the SM 40, and recombining the beams after steering is accomplished. It is also, consequently, the main source of angular drift in the instrument.

Figure 2:
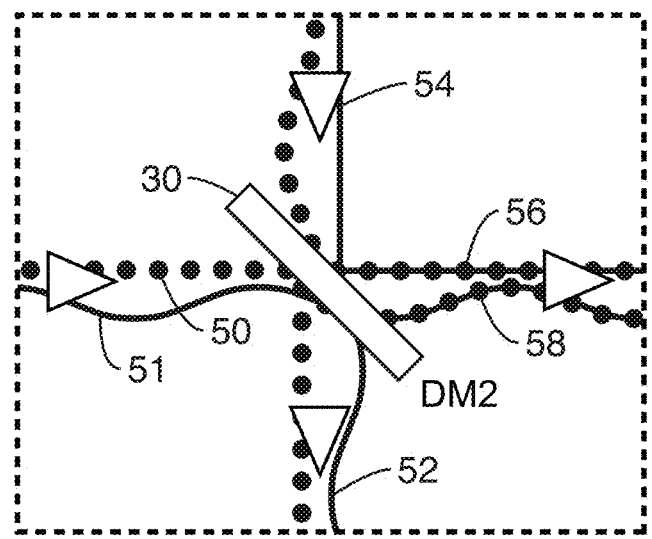
FIG. 2 is an expanded schematic view of the two-sided dichroic mirror component of FIG. 1.

Referring now to the expanded view of FIG. 2, the steered (steerable) beams 51 and un-steered (fixed) beams 50 hit two-sided dichroic mirror assembly (DM2) 30 from the left. Here, only the reference beams 52 get reflected downwards, and the trapping beams pass through and continue to the right (solid line in wave-shaped beam 58, and dotted straight line in beam 56). The remaining optical manipulations are directed to reimaging the reference beam 52 onto the SM 40 and back to the DM2 30. All components in the reference beams' path from the point it is reflected downwards by DM2 30 until it is recombined with the trapping beam at the top of DM2 30 are intended to relay the beam so that it can be reflected back off the steerable mirror SM 40 and then recombined as steered beam 54 with the trapping beam. Relay lenses 34 (RL1/RL2), along with a series of mirrors 24 (M1-M5) ensure that the steering of the reference beam occurs at a conjugate imaging plane to the initial steering operation on the p-polarized trapping and reference beams 42/44 shown in FIG. 3.

Figure 3:
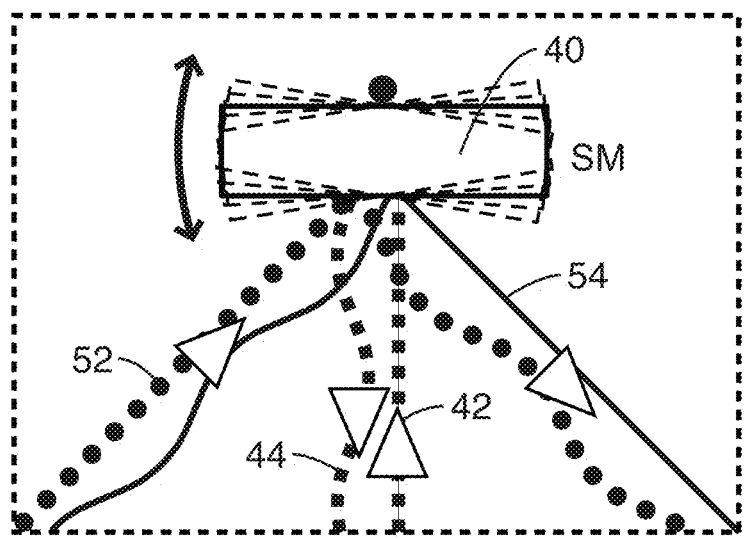
FIG. 3 is an expanded schematic view of the steering mirror of FIG. 1.

The configuration of steering mirror SM 40 and DM2 30 has the effect of cancelling the angle imparted to the beam that was originally steered and imparting that same angle onto the beam that was originally un-steered (see expanded view of FIG. 3, the dotted beam 42 starts un-steered (fixed) and then is steered 44 after reflection off SM 40; likewise, the solid reference beam 52 starts steered and becomes un-steered (fixed) 42 after reflection).

After recombining the reference beam 54 with the trapping beam at DM2 30, the steered trapping beam 51 will overlay with the un-steered reference beam, and vice versa. This means that the p-polarized reference beam (now steered) is combined with the s-polarized trapping beam (always steered) to form output beam 56, and the s-polarized reference beam (no longer steered) is combined with the p-polarized trapping beam to form output beam 58. This novel output can then be used with angular interferometry principles to very precisely measure the relative angular drift between the two beams.

Figure 4A:
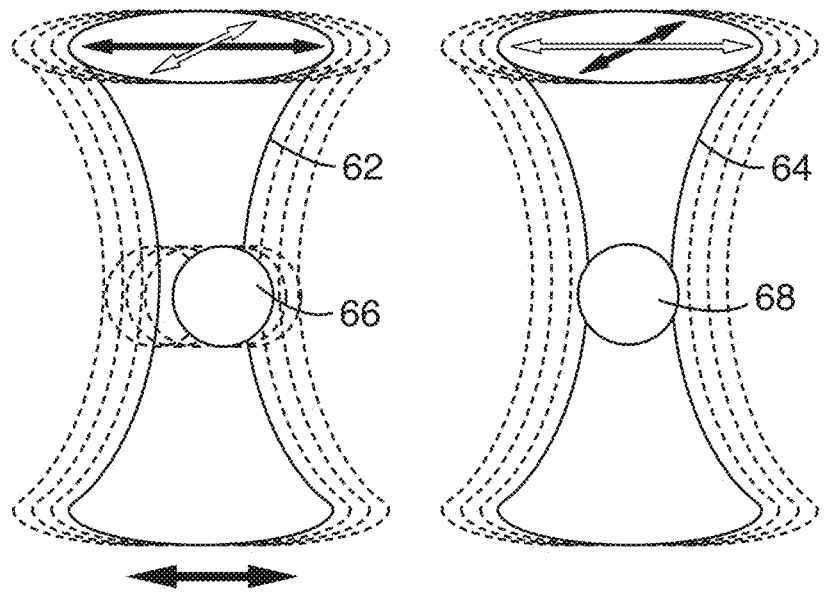
FIG. 4A is a schematic diagram showing the resulting outputs from the optical trap of FIG. 1.
Figure 4B:
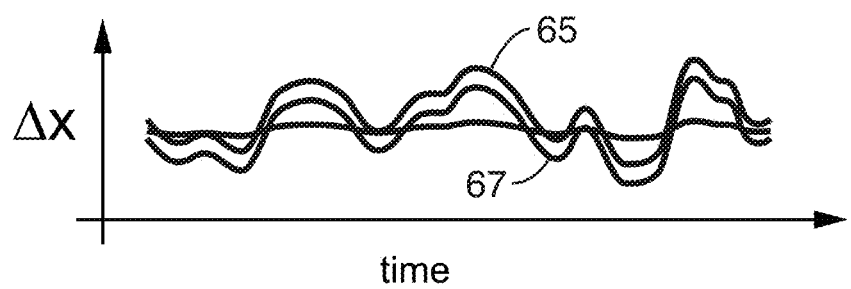
FIG. 4B is a graph of displacement of the reference and trapping beams vs. time in accordance with the outputs from FIG. 4A.

FIG. 4A is a schematic diagram showing the resulting outputs from the system 10, and FIG. 4B shows a graph of displacement of the reference and trapping beams vs. time. After exiting DM2 30, the p-polarized reference beam overlaid with the s-polarized trapping beam is shown as beam 62 with respect to bead 66, and the s-polarized reference beam is overlaid with the p-polarized trapping beam as beam 64 with respect to bead 68. Any mechanical drift arising in the differential path components will necessarily result in relative displacements between an optically trapped bead and its overlaid reference beam (curves 67 and 65 of FIG. 4B respectively), enabling independent detection of instrumental drift.

Figure 5:
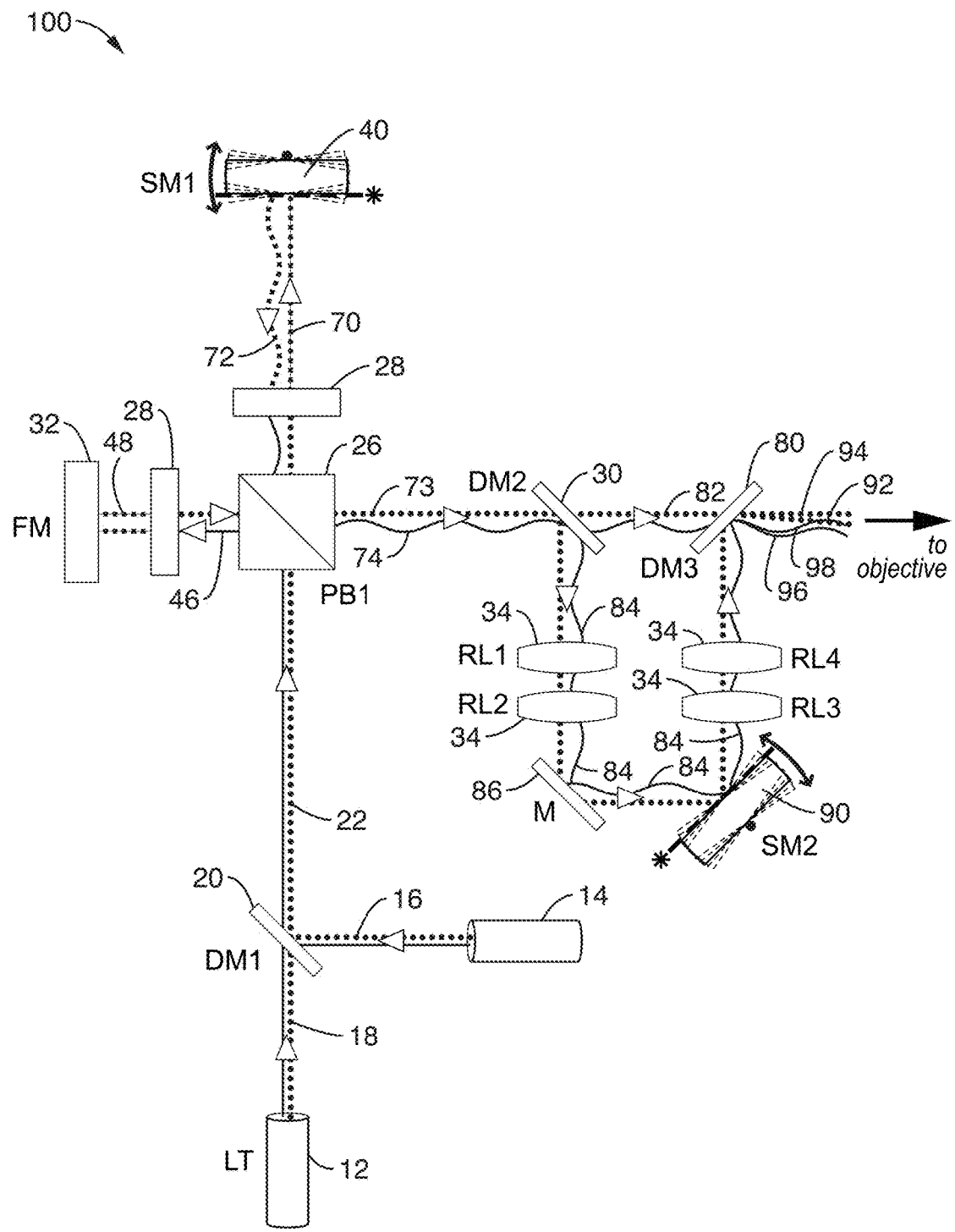
FIG. 5 is a schematic diagram of a drift-corrected, high-resolution optical trap incorporating two steering mirrors in accordance with the present invention.

FIG. 5 is a schematic diagram of a drift-corrected, high-resolution optical trap 100 incorporating two steering mirrors in accordance with the present invention. In this configuration, a second steerable mirror SM2 90 is used to raster both reference beams in time. A reference beam 16 (having a first wavelength) generated from reference laser 14 is combined with a trapping beam 18 (having a second wavelength) from trapping laser 12 using a first dichroic mirror 20 (DM1), and the beams remain collinear as combined beam 22 as it travels through the optical components in the beam steering path. The combined beam 22 (including both polarizations and both wavelengths) is then directed at polarized beam splitter 26 (PB1). The s-polarized beams 46 (both reference and trap) are reflected at 90° and exit to the left of PB1 26. The p-polarized beams 70 (both reference and trap) pass through and exit to the top of PB1 26.

The s-polarized beams 46 exiting PB1 26 to the left pass through a λ/4 retardation plate 28 and are made circularly polarized. This allows the beam 46 to reflect off of fixed mirror 32 (FM) and pass back through the λ/4 retardation plate 28 a second time, turning the reflected beam 48 to now be p-polarized. This manipulation has the effect of turning the (s-polarized) beam 46 that exited the PB1 26 into an orthogonal polarization (p-polarized) beam 48, which will now enter the PB1 26 again, pass through it, and exit to the right.

This process is similarly repeated for the p-polarized beam 70 that exits the top of PB1 26 (it passes through a λ/4 plate 28, becomes circular, gets reflected off a steerable mirror 40 (SM) as steered beam 72, passes back through λ/4 plate 28 a second time, and is then turned s-polarized). Steered beam 72 then enters the top of PB1 26 and is reflected, exiting to the right as beam 74. The overall effect of this manipulation is to allow for the independent splitting of each beam based on polarization, imparting an angle onto one of them via the SM 40, and recombining the beams after steering is accomplished.

The steered beams 74 and un-steered beams 73 hit second dichroic mirror assembly (DM2) 30 from the left. From here, the reference beams 84 get deflected downward, and the trapping beams 82 pass through and continue to the right to hit a third dichroic mirror assembly (DM3) 80. The reference beams 84 pass through a pair of relay lenses 34 (RL1/RL2), which form a two-lens telescope, and reflect off mirror 86 (M) before hitting the second piezoelectric steerable mirror 90 (SM2). SM2 90 preferably comprises a piezoelectric mirror with 4 nanoradian resolution and piezoresistive feedback (e.g. Nano-MTA2, Mad City Labs, Madison, Wis.) to raster both reference beams 84. The rasterized beams are then directed through a second two-lens relay telescope 34 (RT2) before being directed back to DM3. The purpose of using both relay telescopes is to place SM2 90 at a conjugate imaging plane to SM1 40 (conjugate planes are denoted with an asterisk in FIG. 5). The third dichroic mirror assembly (DM3) 80 then combined the reference beams 84 and trapping beams to output reference beams 94/98 with trapping beams 92/96.

Figure 6:
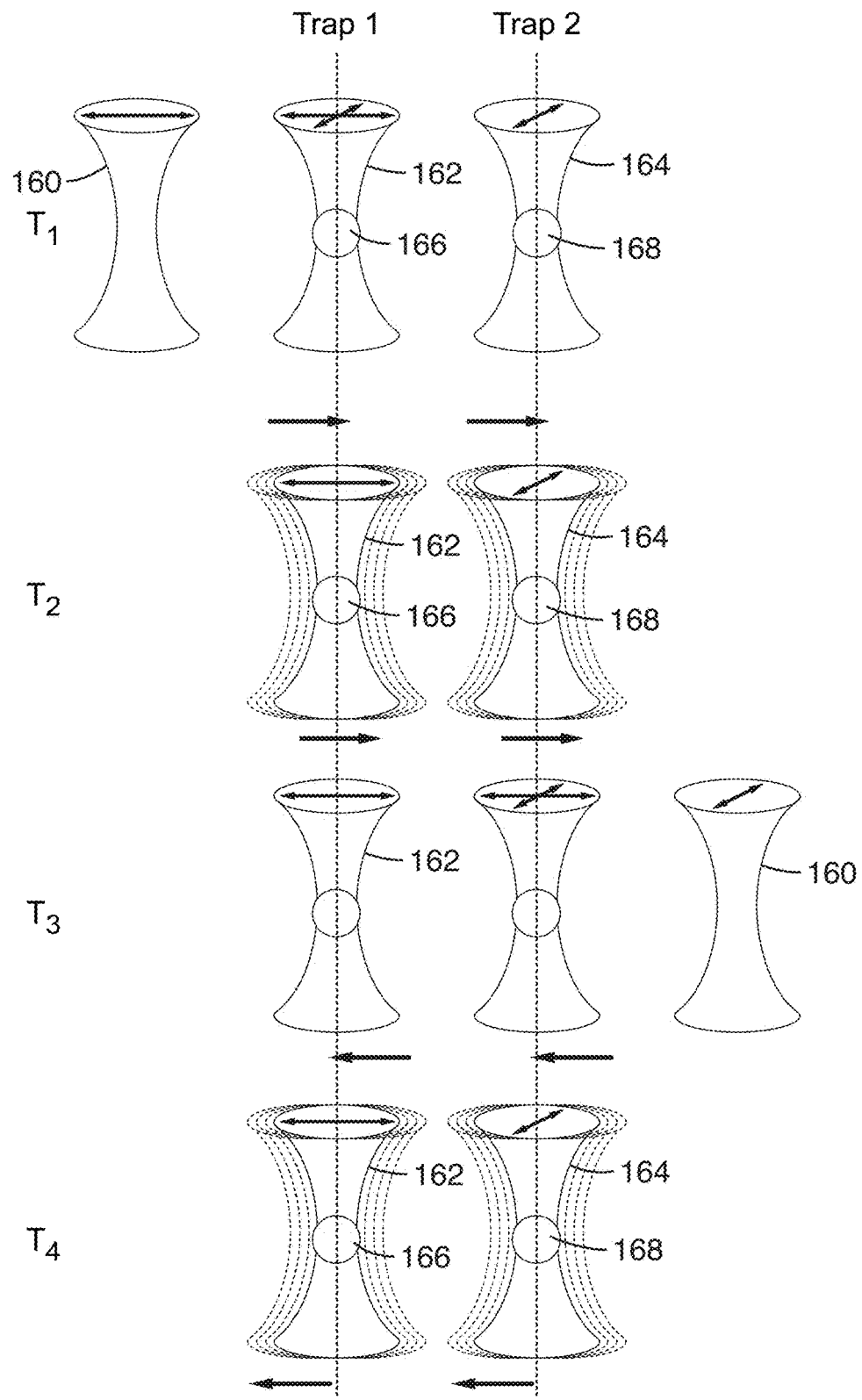
FIG. 6 is a schematic diagram showing the resulting outputs from the optical trap of FIG. 5.

FIG. 6 is a schematic diagram showing the resulting outputs from the optical trap 100 of FIG. 5. At time $T_1$, the reference beam 160 provides information about drift in Trap 1 (162) and bead 166, and at time $T_3$ reference beam 160 provides a readout of the drift in Trap 2 (164) and bead 168. Times $T_2$ and $T_4$ illustrate the movement of the reference beams during the rastering, while the signal at time $T_1$ and $T_3$ are used for measurement.

Trap 100 has particular advantages (e.g. simpler alignment, etc.) but does limit the precision of the drift detection to the angular stability of the SM2 mirror 90 (in this case, 4 nanoradians). A second advantage is that it has the ability to dynamically adjust the reference beam steering to compensate for large amounts of angular drift that would otherwise exceed the linear range of detection.

B. High-Sensitivity Angular Interferometer Based on Back-Focal Plane Interference.

The systems and methods of the present invention may be implemented as an angular interferometer capable of measuring angle variations of a sample laser beam in the order of 50 nrad (at least).

The drift-adjusted interferometer of the present invention generally comprises a microscope objective, a condenser and a position-sensitive photodetector. The microscope objective is used to focus the sample beam to a microsphere, which may be, for instance, fixed in the optical setup. Angle variations of the sample beam produce a change of the interference pattern at the back-focal plane of the condenser, wherein the pattern is imaged onto a position-sensitive detector which provides a signal proportional to the angular change of the beam (back-focal plane interferometry). This particular implementation is limited by drift of the fixed microsphere, which is used as a reference. To eliminate this problem, angle variation of the sample beam can also, for instance, be measured relative to a reference beam with an optical property that allows both beams to be separated after the condenser (i.e., orthogonal polarizations or different wavelengths). In such an embodiment, the two beams are focused onto the microsphere and the difference between the back-focal plane interferometry signal of the sample and reference beam corresponds to the angular variation of the sample with respect to the reference beam.

Figure 7:
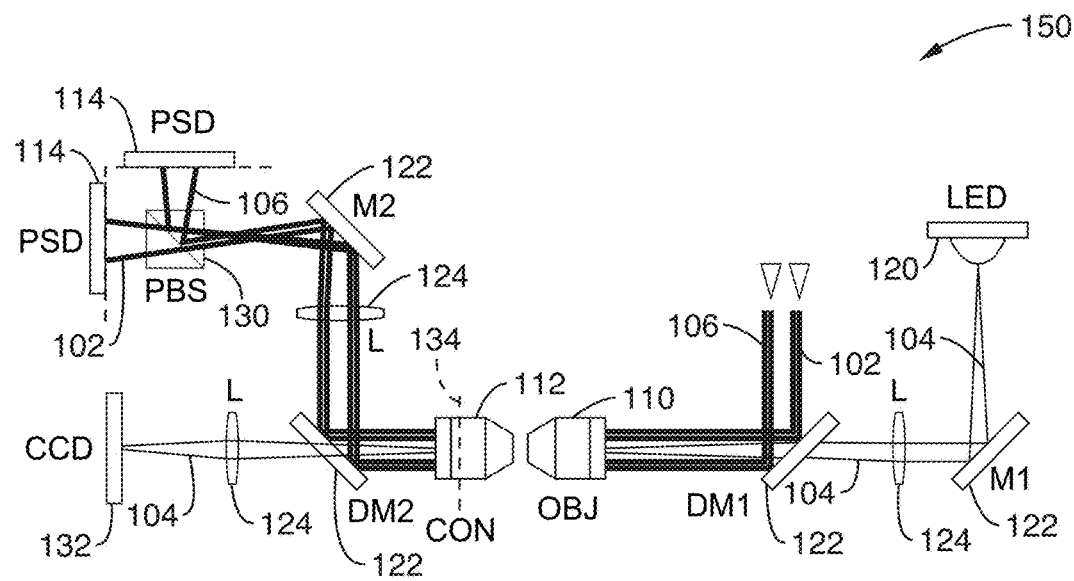
FIG. 7 is a schematic diagram of a drift-adjusted interferometer in accordance with the present invention.

FIG. 7 shows a generalized schematic diagram of a drift-adjusted angular interferometer 150 in accordance with the present invention. The figure shows two implementations of the device. In existing interferometers, a sample beam is focused onto a microsphere fixed in the sample plane by the focusing objective. The back-focal plane of a condenser is imaged onto a position-sensitive detector by a relay lens.

Interferometer 150 employs a dual-beam setup wherein a collinear sample beam 102 and reference beam 106 are focused by the objective 110 (OBJ) to trap a microsphere. Both the sample 102 and reference beam 106 interference patterns created at the back-focal plane 134 of the condenser 112 are imaged onto separate position-sensitive detectors 114 (PSD's) by lens L. Imaging light 104 from LED 120 is directed to dichroic mirror 122 (DM1) via mirror 122 (M1) and lens 124 and combined toward objective 110. A second dichroic mirror 122 (DM2) is used to reflect the sample beam 102 and reference beam 106 through lens 124 toward a second mirror 122 (M2) and PSD's 114, and imaging light 104 through another lens 124 to be registered by detector 132 (CCD).

In the configuration shown in FIG. 7, both reference beam 106 and sample beam 102 have orthogonal polarizations, and are thus separated by a polarizing beam-splitter 130 (PBS). An imaging system such as the microscope can be used to image the sample plane imaging light 104. The back-focal plane 134 of the condenser 112 and PSD 114 planes are conjugate to each other.

It is appreciated that the interferometer 150 can be used in a dual-trap optical tweezers instrument to correct for instrumental drift by including a second wavelength of light (as detailed in FIG. 1) by replacing the mirror 122 (M2) with a dichroic mirror. In this case, both orthogonal polarizations of the second reference wavelength of light will be passed through a new dichroic mirror and imaged onto two additional PSDs (not shown), replicating the PBS-2 PSD layout illustrated in FIG. 7.

C. Experimental Results

Figure 8:
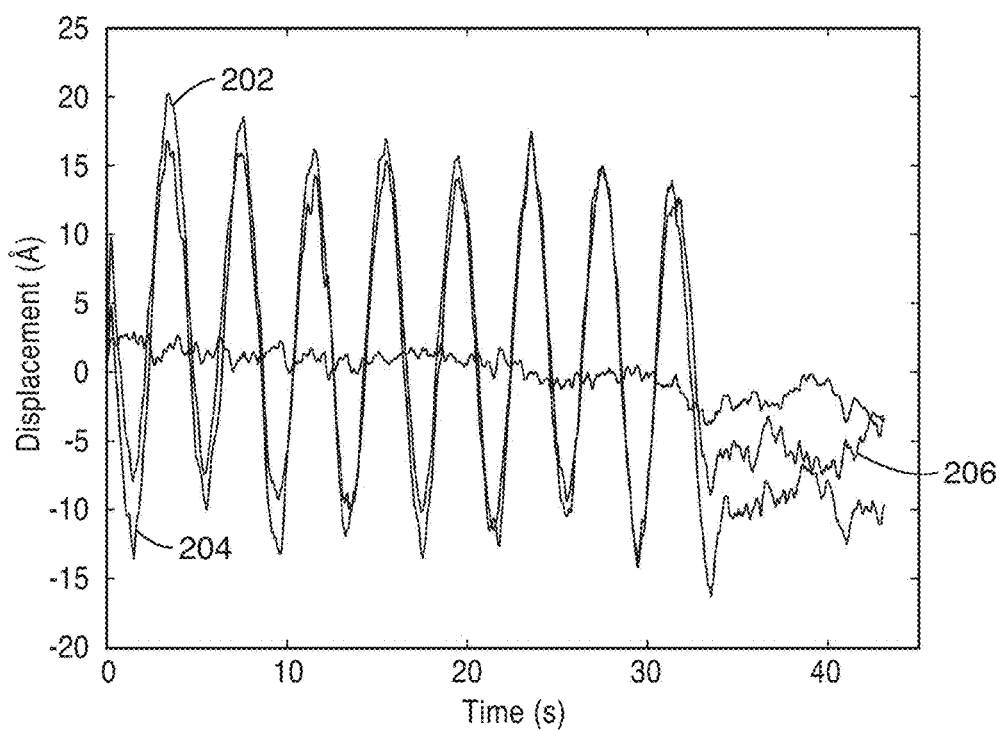
FIG. 8 is a plot of displacement vs. time for a reference beam, trapping beam, and drift-corrected signal of an exemplary trap setup in accordance with the optical trap of FIG. 1.
Figure 9:
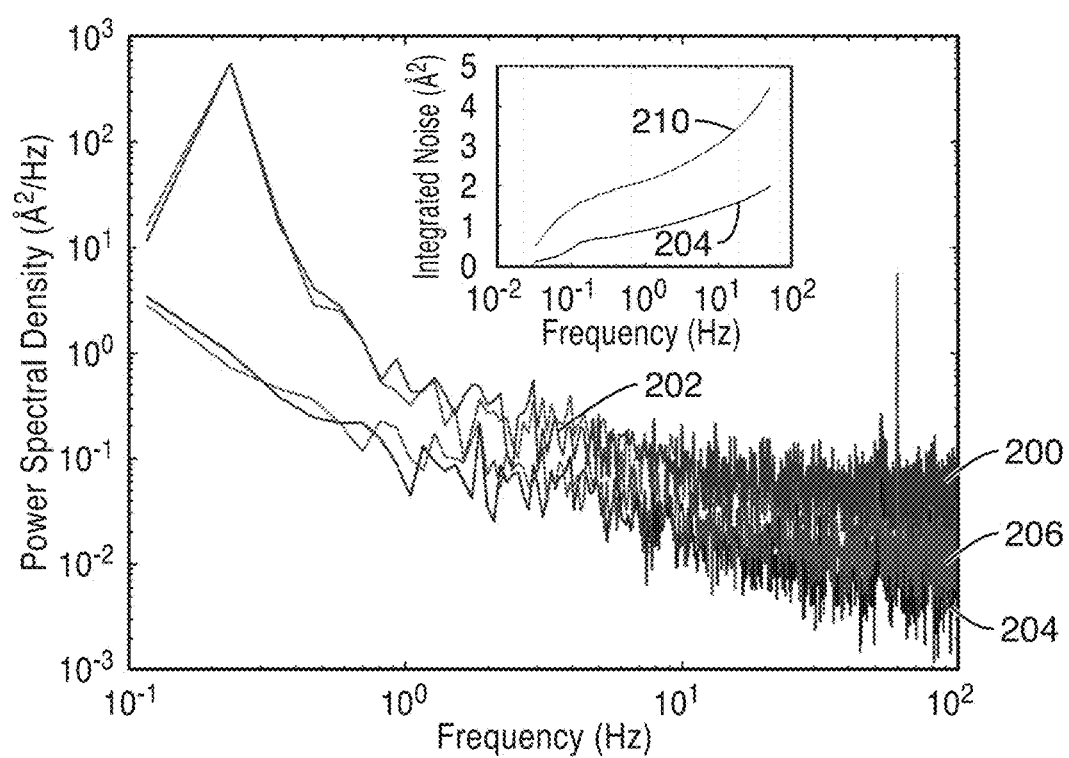
FIG. 9 is a graph of the power spectral density with respect to frequency for drift-corrected data.

FIG. 8 and FIG. 9 are plots illustrating real-time drift-correction of the optical trap of FIG. 1.

FIG. 8 is a plot of displacement vs. time for a reference beam trapping beam and drift-corrected signal in accordance with the present invention. To simulate mechanical drift within the differential path components, the steerable mirror was oscillated to produce a 25 Å amplitude, 0.25 Hz sinusoidal motion of the steered trap within a 2 µm bead that is simultaneously trapped by both trapping beams. The displacement detected by the trapping beam 202 closely matches the displacement detected by the reference beam 200. The mechanical drift is calculated and subtracted from the detected signals to yield a drift-corrected displacement signal 204.

FIG. 9 is a graph of the power spectral density with respect to frequency for drift-corrected data. The power spectral density of the time series reveals that the drift-corrected data 204 is comparable in noise characteristics to the quietest conditions achieved in the test laboratory 206. Drift-correction demonstrates that even under quiet conditions, the integrated low-frequency noise of our instrument 210 is reduced by ~50% after correcting for the instrument drift 204.

The disclosed invention describes an optical instrument able to measure angle variations of a laser beam in the µrad to nrad range. Such device has a wide variety of applications including precision alignment of optical setups, monitoring the angular variation of a beam over long periods of time and angular calibration of optomechanical components.

The devices described herein are able to measure and correct drift of the optical traps with angstrom-level precision leading to reduced instrumental noise and higher resolution. Importantly, systems and methods of the invention make it possible to address environmental noise due to acoustics and vibrations that have largely limited the application of optical traps among the broader research community. That is, without such drift correction capabilities, optical traps currently require subterranean laboratories with specified vibration, acoustic, and temperature controls that are prohibitively expensive for the average lab. The drift correction method of the present invention allows for state-of-the-art measurements in previously inaccessible settings by providing for a real-time measurement of instrument drift.

The systems and methods of the present invention are intended to provide cost-effective optical traps for the broader scientific community, appealing to the non-specialist. The laboratories of the target market for these instruments generally lack sufficient environmental controls to make high-resolution measurements possible. In fact, only a handful of labs around the world meet the technical specifications to achieve the passive stability required for angstrom-level sensitivity. Therefore, the real-time drift correction methodology presented herein substantially improves the resolution that is achieved in commercially available optical traps under typical laboratory conditions. In addition, given the ability of the systems and methods of the present invention to be implemented in conventional optical trapping instruments as a modular addition that is compatible with existing designs, the systems and methods of the present invention can be implemented in existing devices as an add-on to an existing trap. As such, the present invention broadens the target market for optical trapping well beyond the optical tweezers specialists, to the entire scientific community at large.

A particularly novel aspect of the present invention is the use of a refractive particle to essentially amplify the sensitivity of the instrument. The systems and methods of the present invention allows for use of a lens to transform the angular orientation of light into position information after passing through the lens. For example, for an angular deviation equal to 36 nanoradians in one particular implementation of the system of the present invention, this spatial transformation property of lenses results in displacements on the order of 1 angstrom in front of our objective lens. By then collecting the light that is scattered from the microsphere that the beam is focused into, and interfering it with the unscattered light passing through the sample, the interference can be monitored at the back focal plane of the condenser lens to achieve direct, high-precision detection of displacements within the sample plane, uniquely exploiting the interference created when a coherent, collimated light source is focused into a refractive sample.

It should be noted that the systems and methods of the present invention do not require a microscope objective lens to be implemented. Less expensive aspherical lenses, for example, could be used to reproduce the sensitivity of the implementation above. As such, the systems and methods of the present invention may be implemented in a more compact and more sensitive system than commercial instruments at a fraction of the cost.

Commercial devices used to measure the angular deviation of a single beam include autocollimators and interferometers. The highest resolution currently offered by a commercial system is 25 nrad (for a single beam). The angular interferometer of the present invention is able to measure relative angle variations (of a sample beam relative to a reference beam) as small as 50 nrad with both sample and reference beam propagating in open air.

By eliminating angular noise introduced to the beams by atmospheric fluctuations (for instance, by enclosing the device in vacuum), even smaller angular variations can be measured. Finally, by trapping the microsphere in air or vacuum instead of a liquid medium, Brownian noise of the microspheres can be eliminated and the instrumental noise decreased even further.

From the discussion above it will be appreciated that the invention can be embodied in various ways, including but not limited to the following:

1. A drift-corrected optical apparatus, comprising: a beam splitter; a fixed mirror in a first optical path of the beam splitter; a steerable mirror in a second optical path of the beam splitter; a first dichroic mirror; wherein the first dichroic mirror is configured to combine a reference beam having a first optical property and a trapping beam having a second optical property into a collinear beam that is directed to the beam splitter; and wherein the beam splitter is configured to split each of the trapping beam and reference beam into first and second components, the first component being directed to the fixed mirror and reflected back to the beam splitter as a fixed beam component, and the second component being directed to the steerable mirror and reflected back to the beam splitter as a steerable beam component, the beam splitter outputting the steerable beam component and the fixed beam component in a third optical path; and a second dichroic mirror disposed in the third optical path to split each of the steerable beam component and the fixed beam component into reference beam components and trapping beam components; wherein the reference beam components are directed through a separate optical path with respect to the trapping beam components and then combined with the trapping beam components such that the angle of the reference beam components are optically overlaid with the trapping beam components to provide a direct measurement of drift associated with the optical apparatus.

2. An apparatus as in any of the previous embodiments: wherein the first optical property comprises a first wavelength and the second optical property comprises a second wavelength; wherein the first component comprises a first polarization and the second component comprises second polarization, the first polarization being orthogonal to the second polarization; and wherein the beam splitter comprises a polarizing beam splitter such that the fixed beam component is directed in the first optical path at the first polarization and the steerable beam component is directed in the second optical path at the first polarization.

3. An apparatus as in any of the previous embodiments, further comprising: a first quarter waveplate located in the first optical path between the beam splitter and the fixed mirror; and a second quarter waveplate located in the second optical path between the beam splitter and the steerable mirror; wherein the first quarter waveplate and the second quarter waveplate are configured such that the fixed beam component is directed back to the beam splitter at the second polarization and the steerable beam component is directed back to the beam splitter at the first polarization.

4. An apparatus as in any of the previous embodiments, wherein the reference beam components are reimaged on the steerable mirror and directed back to the second dichroic mirror where they are combined with the trapping beam components.

5. An apparatus as in any of the previous embodiments: wherein the reference beam components are split from the second dichroic mirror as a fixed reference beam component at the second polarization and a steerable reference beam component at the first polarization; and wherein the fixed reference beam component is reflected off the steerable mirror as a steerable reference beam component at the second polarization and the fixed reference beam component is reflected off the steerable mirror as a fixed reference beam component at the first polarization.

6. An apparatus as in any of the previous embodiments wherein the second dichroic mirror is configured to output a reference beam component at the second polarization overlaid with a trapping beam component at the first polarization, and a reference beam component at the first polarization overlaid with a trapping beam component at the second polarization.

7. An apparatus in any of the previous embodiments, further comprising one or more relay lenses such that steering of the reference beam components occurs at a conjugate imaging plane to the trapping beam components.

8. A beam steering method, comprising: providing two reference beams with an optical property that allows them to be separated from two trapping beams; combining the reference and trapping beams collinearly, wherein each reference beam travels the same path as one of the trapping beams and thus experience the same angular noise; optically manipulating the reference beams so that each reference beam overlays with a trapping beam of opposite polarization; and focusing each pair of beams on a microsphere wherein four resulting back-focal plane interferometry signals are monitored, and wherein relative motion between a given trapping beam with its overlaid reference beam provides a direct measurement of physical drift occurring due to mechanical drift of differential path components.

9. A method as recited in claim 8: wherein the two reference beams comprise a fixed reference beam at a first polarization and steerable reference beam at a second polarization; wherein the two trapping beams comprise a fixed trapping beam at the second polarization and steerable trapping beam at the first polarization; and wherein four resulting back-focal plane interferometry signals comprise the steerable reference beam at the second polarization overlaid with the steerable trapping beam at the first polarization, and the fixed reference beam at the first polarization overlaid with the fixed trapping beam at the second polarization.

10. A beam steering apparatus, comprising: a polarizing beam splitter; a fixed mirror in a first optical path of the beam splitter; and a steerable mirror in a second optical path of the beam splitter; wherein, when a reference beam and a trapping beam are directed to the beam splitter, each said beam is split into two components, one said component being directed to the fixed mirror and reflected back to the beam splitter as a fixed beam component, and the other said component being directed to the steerable mirror and reflected back to the beam splitter as a steerable beam component; wherein the two reflected components of each beam are further split into a fixed reference beam, a fixed trapping beam, a steerable reference beam and a steerable trapping beam via a dichroic mirror; wherein said dichroic mirror directs the reference beams to an optical circuit configured to manipulate the reference beams, and redirect the reference beams for recombination; and wherein, after recombination, the angle of the reference beam components are optically overlaid with the trapping beam components to provide a direct measurement of drift associated with the optical apparatus.

11. A beam steering apparatus as in any of the previous embodiments, wherein the optical circuit is configured to recombine the reference beams at the dichroic mirror.

12. A beam steering apparatus as in any of the previous embodiments, further comprising: a first quarter waveplate between the beam splitter and the fixed mirror; and a second quarter waveplate between the beam splitter and the steerable mirror; wherein the first quarter waveplate and the second quarter waveplate are configured to reverse polarization of one or more components of the reference beam and the trapping beam.

13. A beam steering apparatus as in any of the previous embodiments, wherein the fixed reference beam, fixed trapping beam, steerable reference beam and steerable trapping beam are recombined as a fixed reference beam at a first polarization and steerable reference beam at a second polarization and a fixed trapping beam at the second polarization and steerable trapping beam at the first polarization.

14. A beam steering apparatus as in any of the previous embodiments, wherein the second dichroic mirror is configured to output a reference beam component at the second polarization overlaid with a trapping beam component at the first polarization, and a reference beam component at the first polarization overlaid with a trapping beam component at the second polarization.

15. An angular interferometer apparatus, comprising: a focusing objective; a condenser; and a position sensitive detector; said focusing objective positioned to focus a reference beam and a sample beam onto a microsphere fixed in the sample plane by the focusing objective; the optical beam and sample beam having distinguishing optical characteristics that allow the sample beam and reference beam to be separated after the condenser; said detector positioned for imaging the back-focal plane of the condenser; said detector providing a signal proportional to the angular change of the sample beam due to back-focal plane interferometry; wherein a difference between the back-focal plane interferometry signal of the sample and reference beam corresponds to the angular variation of the sample respect to the reference beam.

16. An apparatus as in any of the previous embodiments, wherein the optical beam and sample beam have distinguishing orthogonal polarizations.

17. An apparatus as in any of the previous embodiments, wherein the optical beam and sample beam have distinguishing wavelengths.

18. An apparatus as in any of the previous embodiments, wherein sample beam and reference beam interference patterns created at the back-focal plane of the condenser are imaged onto separate position sensitive detectors via a dichroic mirror.

19. An apparatus as in any of the previous embodiments, further comprising: a polarizing beam-splitter disposed between the position sensitive detectors and the dichroic mirror; and wherein the reference beam and sample beam have orthogonal polarizations such that they are separated by a polarizing beam-splitter reference beam and sample beam to be imaged onto respective position sensitive detectors.

20. A method for measuring angular variations of an optical beam, the method comprising: focusing a reference beam and a sample beam onto a microsphere; imaging the back-focal plane of a condenser in the optical path of the sample beam onto a position sensitive detector; separating the sample beam and reference beam after the condenser via distinguishing optical characteristics of the sample beam and reference beam; wherein angle variations of the sample beam produce a change of the interference pattern imaged at the back-focal plane of the condenser; and wherein the detector provides a signal proportional to the angular change of the sample beam due to back-focal plane interferometry; and determining angular variations of the sample beam with respect to the reference beam from said signal via a difference between the back-focal plane interferometry signal of the sample beam and reference beam.

21. A method as in any of the previous embodiments, wherein the optical beam and sample beam have distinguishing orthogonal polarizations.

22. A method as in any of the previous embodiments, wherein the optical beam and sample beam have distinguishing wavelengths.

23. A method as in any of the previous embodiments, wherein sample beam and reference beam interference patterns created at the back-focal plane of the condenser are imaged onto separate position sensitive detectors via a dichroic mirror.

24. An apparatus as recited in any of the previous embodiments, wherein the separate optical path of the reference beam components comprises a second steerable mirror that is used to raster both reference beam components.

25. An apparatus as recited in any of the previous embodiments, wherein the rasterized reference beam components are combined with the trapping beam components via a third dichroic mirror.

26. A beam steering apparatus as recited in any of the previous embodiments, wherein the optical circuit comprises a second steerable mirror that is used to raster both reference beam components.

27. A beam steering apparatus as recited in any of the previous embodiments, wherein the optical circuit further comprises a second dichroic mirror that combines the reference beam components with the trapping beam components.

28. A beam steering apparatus as recited in any of the previous embodiments, wherein the optical circuit further comprises one or more relay lenses such that steering of the reference beam components occurs at a conjugate imaging plane to the trapping beam components.

29. A beam steering method as in any of the previous embodiments, wherein optically manipulating the reference beams comprises rasterizing the reference beams with first and second steerable mirrors.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An angular interferometer apparatus, comprising:
   a focusing objective;
   a condenser; and
   a position sensitive detector;
   said focusing objective positioned to focus a reference beam and a sample beam onto a microsphere fixed in the sample plane by the focusing objective;
   the reference beam and sample beam having distinguishing optical characteristics that allow the sample beam and reference beam to be separated after the condenser;
   said detector positioned for imaging the back-focal plane of the condenser;
   said detector providing a signal proportional to the angular change of the sample beam due to back-focal plane interferometry;
   wherein a difference between the back-focal plane interferometry signal of the sample beam and reference beam corresponds to the angular variation of the sample beam with respect to the reference beam;
   wherein angle variations of the sample beam produce a change of the interference pattern imaged at the back-focal plane of the condenser;
   wherein the detector provides a signal proportional to the angular change of the sample beam due to back-focal plane interferometry; and
   wherein angular variations of the sample beam with respect to the reference beam are determined from said signal via a difference between the back-focal plane interferometry signal of the sample beam and reference beam.

2. An apparatus as recited in claim 1, wherein the optical beam and sample beam have distinguishing orthogonal polarizations.

3. An apparatus as recited in claim 1, wherein the optical beam and sample beam have distinguishing wavelengths.

4. An apparatus as recited in claim 1, wherein sample beam and reference beam interference patterns created at the back-focal plane of the condenser are imaged onto separate position sensitive detectors via a dichroic mirror.

5. An apparatus as recited in claim 4, further comprising:
   a polarizing beam-splitter disposed between the position sensitive detectors and the dichroic mirror; and
   wherein the reference beam and sample beam have orthogonal polarizations such that they are separated by a polarizing beam-splitter reference beam and sample beam to be imaged onto respective position sensitive detectors.

6. A method for measuring angular variations of an optical beam, the method comprising:
   providing a microsphere tethered by a molecule of interest;
   focusing a reference beam and a sample beam onto the microsphere;
   imaging the back-focal plane of a condenser in the optical path of the sample beam onto a position sensitive detector;
   separating the sample beam and reference beam after the condenser via distinguishing optical characteristics of the sample beam and reference beam;
   wherein angle variations of the sample beam produce a change of the interference pattern imaged at the back-focal plane of the condenser;
   wherein the detector provides a signal proportional to the angular change of the sample beam due to back-focal plane interferometry; and
   determining angular variations of the sample beam with respect to the reference beam from said signal via a difference between the back-focal plane interferometry signal of the sample beam and reference beam.

7. A method as recited in claim 6, wherein the optical beam and sample beam have distinguishing orthogonal polarizations.

8. A method as recited in claim 6, wherein the optical beam and sample beam have distinguishing wavelengths.

9. A method as recited in claim 6, wherein sample beam and reference beam interference patterns created at the back-focal plane of the condenser are imaged onto separate position sensitive detectors via a dichroic mirror.

* * * * *